US012472121B1

(12) United States Patent
Suo

(10) Patent No.: US 12,472,121 B1
(45) Date of Patent: Nov. 18, 2025

(54) IN-BODY MASSAGER

(71) Applicant: Shenzhen Linglang Technology Co., LTD., Guangdong (CN)

(72) Inventor: Hongdu Suo, Guangdong (CN)

(73) Assignee: Shenzhen Linglang Technology Co., LTD., Guangdong (CN)

( * ) Notice: Subject to any disclaimer, the term of this patent is extended or adjusted under 35 U.S.C. 154(b) by 0 days.

(21) Appl. No.: 19/027,482

(22) Filed: Jan. 17, 2025

(30) Foreign Application Priority Data

Dec. 26, 2024 (CN) ........................ 202423304834.X
Jan. 10, 2025 (CN) ......................... 202520076565.1

(51) Int. Cl.
*A61H 19/00* (2006.01)
*A61H 7/00* (2006.01)
*A61H 23/02* (2006.01)

(52) U.S. Cl.
CPC ............. *A61H 19/44* (2013.01); *A61H 7/007* (2013.01); *A61H 23/0254* (2013.01); *A61H 2007/009* (2013.01); *A61H 2201/0153* (2013.01); *A61H 2201/14* (2013.01); *A61H 2201/1671* (2013.01); *A61H 2201/1673* (2013.01)

(58) Field of Classification Search
CPC ........ A61H 19/00; A61H 19/30; A61H 19/32; A61H 19/34; A61H 19/40; A61H 19/44
USPC ............................................................ 601/84
See application file for complete search history.

(56) References Cited

U.S. PATENT DOCUMENTS 3,874,373 A * 4/1975 Sobel ..................... A61H 19/34 601/112
6,190,307 B1 * 2/2001 Tsai ....................... A61H 19/34 601/51
11,771,619 B1 * 10/2023 Yan ........................ A61H 19/34 600/38
12,208,053 B1 * 1/2025 Liu ...................... A61H 23/006
2006/0069330 A1 * 3/2006 Nan ....................... A61H 19/34 601/72
2018/0161236 A1 * 6/2018 Bailey .................... A61H 19/44
2023/0000717 A1 * 1/2023 Wiles ..................... A61H 13/00
2024/0299239 A1 * 9/2024 Yan .................... A61H 23/0254
2025/0032351 A1 * 1/2025 Yan ........................ A61H 19/40

* cited by examiner

*Primary Examiner* — Justine R Yu
*Assistant Examiner* — Christopher E Miller
(74) *Attorney, Agent, or Firm* — ScienBiziP, P.C.

(57) ABSTRACT

An in-body massager for massaging a part to be massaged is provided. The in-body massager includes a shell, the shell is capable of being inserted into a body for massaging the part to be massaged; a moving space is defined in the shell, the moving space including a first opening which is air communicated to an exterior of the in-body massager, the first opening is defined in a lateral wall of the shell; a driver mounted in the shell; a massage member partly extends into the moving space for contacting the part to be massaged; wherein the massage member is connected to the driver, and rotatable along an extending direction of the shell when driven by the driver.

20 Claims, 10 Drawing Sheets

IN-BODY MASSAGER

RELATED APPLICATIONS

This application claims the benefit of priority to Chinese Patent Application Number 202423304834.X filed on Dec. 26, 2024, and Chinese Patent Application Number 202520076565.1 filed on Jan. 10, 2025, in the China National Intellectual Property Administration. The entire contents of the above-identified application is hereby incorporated by reference.

TECHNICAL FIELD

The present application relates to the field of massage devices, in particular to an in-body massager.

BACKGROUND ART

During childbirth by a woman, pelvic floor muscles may be overstretched when a fetus passes through the birth canal, thereby resulting in muscle relaxation. After childbirth, the pelvic floor muscles may suffer from a continuous pressure due to postnatal urinary retention, thereby exacerbating muscle relaxation.

Therefore, it is necessary to repair pelvic floor muscles of women through specific repair methods. Currently, Existing repair methods include anal lifting exercises, Kegel training, pelvic floor massagers, pelvic floor neuromuscular electrical stimulation, and biological feedback therapy.

However, considering that some women are weaker after childbirth and need to take care of their children, quick pelvic floor massagers are widely popular among women.

The existing pelvic floor massagers available on the market include two types: non-in-body massagers and in-body massagers. As to the in-body massager, a part to be massaged is patted and massaged through a massage mechanism at an end of a main body, however, the massage mechanism is required to small enough to entering the body of a woman, moreover, the patting strength cannot be too strong because the pelvic floor muscles of the woman are easily injured secondarily.

As a result, a massager is urgently designed to smoothly enter the body of the woman and gently massage muscles of the woman.

BRIEF DESCRIPTION OF DRAWINGS

In order to illustrate the technical solution in embodiments of the present invention more clearly, the following briefly introduces accompanying drawings used in the description of the embodiments. Obviously, the accompanying drawings in the following description are only some embodiments of the present invention. Those of ordinary skill in the art can obtain other accompanying drawings from these accompanying drawings without any creative efforts.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

Embodiment 1

Figure 1:
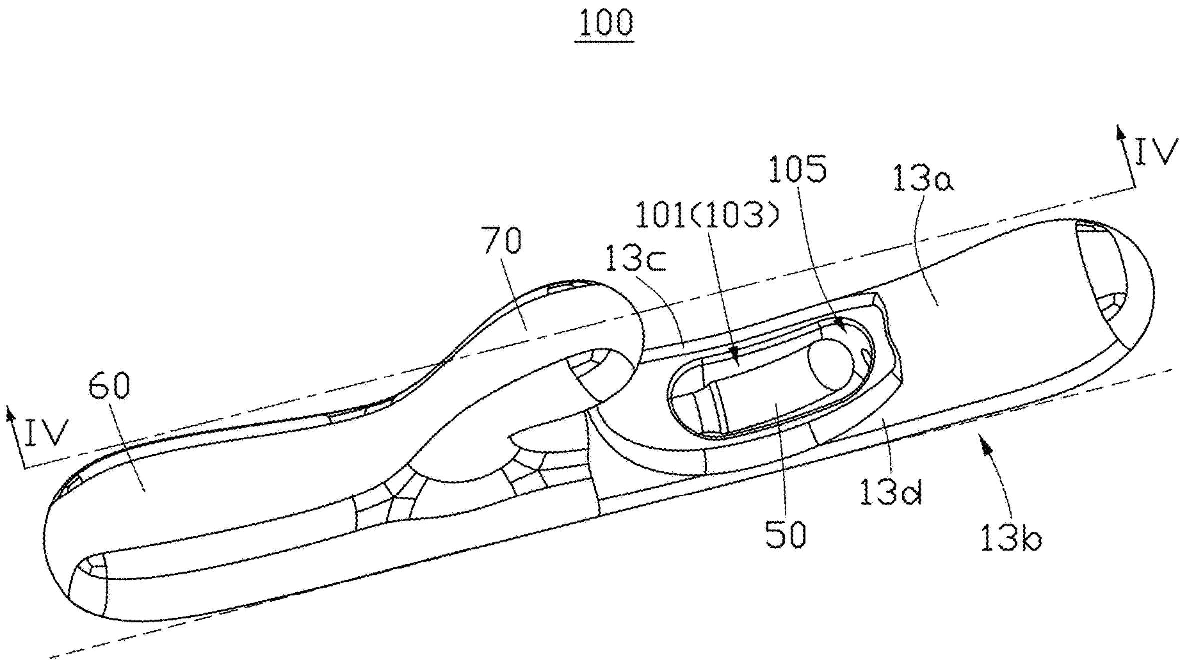
FIG. 1 is a three-dimensional diagram of an in-body massager of Embodiment 1 of the present disclosure.

Referring to FIG. 1, the present disclosure provides an in-body massager 100, and the in-body massager 100 is capable of entering a body of a woman and generating a rotation massage effect to knead and massage pelvic floor muscles of the woman.

Figure 2:
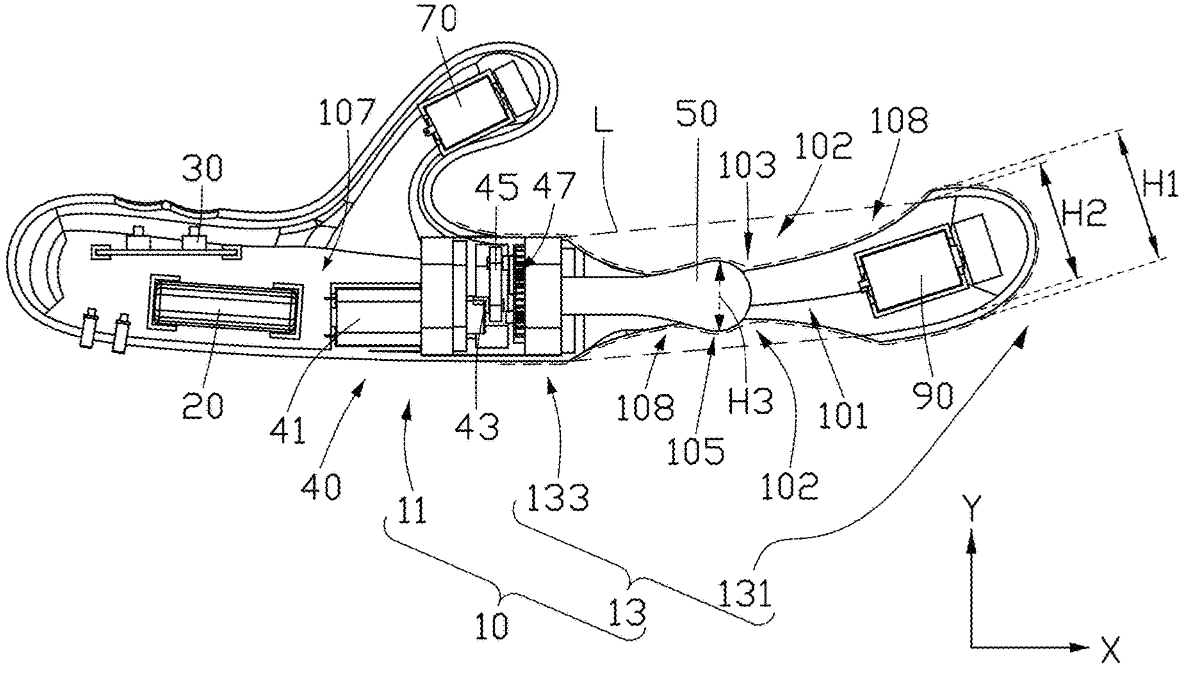
FIG. 2 is a three-dimensional diagram of the in-body massager shown in FIG. 1 with a part of a shell being removed.
Figure 3:
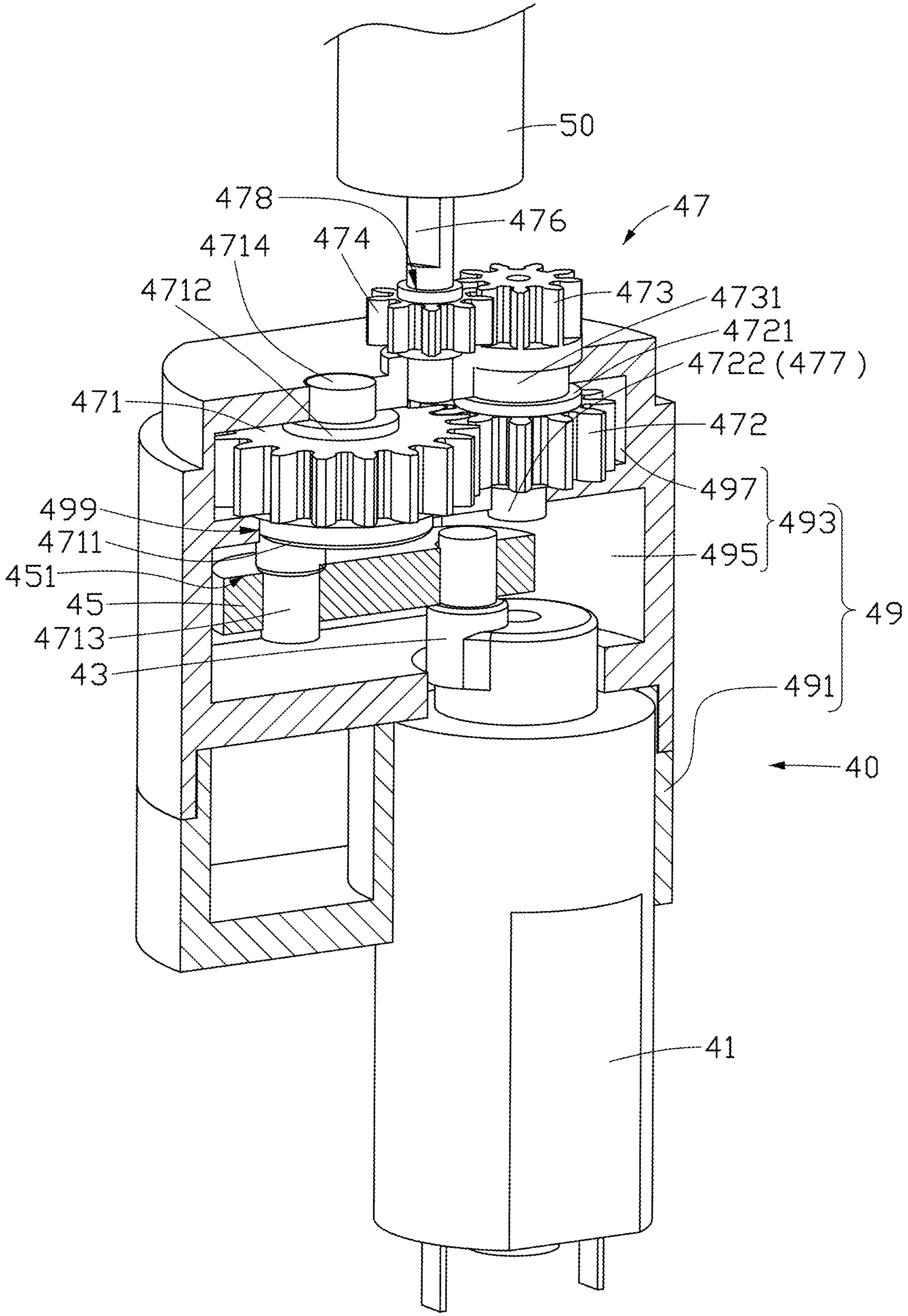
FIG. 3 is a specific structural diagram of a driving mechanism of the in-body massager shown in FIG. 2.

Referring to FIG. 2 and FIG. 3, the in-body massager 100 includes a shell 10, a battery 20, a circuit board 30, a driving mechanism 40, and a massage member 50. The battery 20, the circuit board 30 and the driving mechanism 40 are arranged in the shell 10. A middle portion of the shell 10 is recessed relative to opposite ends portion of the shell in an extending direction of the shell 10 to form a recess area 108. A moving space 101 is defined in the recessed area 108 and passes through opposite sides of the shell 10 in a direction vertical to the extending direction of the shell 10. Thus, the moving space 101 is air communicated with the exterior at the opposite sides of the shell. The massage member 50 is partly received in the shell 10, with one end of the massage member 50 being connected to the driving mechanism 40, the other end extending into the moving space 101. Under the driving of the driving mechanism 40, the massage member 50 rotates in a reciprocating manner within the moving space 101, to knead and massage the pelvic floor muscles.

The shell 10 is strip-shaped and extends along the extension direction. The shell 10 includes a handle portion 11 and an in-body portion (insertion portion) 13 which are integrally formed with the handle portion 11. The in-body portion 13 extends along the extension direction of the shell 10, and is insertable into the vagina of a woman to rotationally massage pelvic floor muscles of the woman. The in-body portion 13 includes a distal end 131 and a connecting end 133 connected to the handle portion 11, the moving space 101 is formed adjacent to the connecting end 133.

Referring to FIG. 1 and FIG. 2, the in-body portion 13 may be a cylindrical shape, and includes a first surface (e.g. a top surface) **13*a*, a second surface 13*b* (e.g. a bottom surface), a third surface 13*c* (e.g. a rear surface), and a fourth surface 13*d* (e.g. a front surface), wherein the first surface 13*a* and the second surface 13*b* are two opposite side surfaces of the in-body portion 13, the third surface 13*c* and the fourth surface 13*d* are another two opposite side surfaces of the in-body portion 13, and the first surface 13***a* and the third surface 13*c* and the fourth surface 13*d* are in arc connection.

A portion of the in-body portion 13 close to the handle portion 11 is recessed inwards at the first and second surface 13*a* and 13*b* to form two recessed surface 102, and the two recessed surfaces 102 are respectively arranged on the first surface 13*a* and the second surface 13*b* and are arranged opposite to each other. The recessed surfaces 102 may be curved and are formed by extending downwards in an inclined manner from one end adjacent to the handle portion 11 and extending upwards towards away from the handle portion 11. When viewed from a cross section of the shell 10, the cross section of the recessed surface 102 is an arc-shaped structure, for example, a middle portion of the recessed surface 102 in the top surface is the lowest and two ends of the recessed surface 102 are higher than the middle portion. In the present embodiment, the recessed surface 102 is an arc-shaped strip structure. It can be understood that the recessed surface 102 may also be of other structures, for example, a curved surface, a flat surface, a bending surface, etc., which can be designed according to actual needs. A moving space 101 is defined in the in-body portion and penetrates through the middle position of the two recessed surfaces 102. The moving space 101 has a first opening 103 in the first surface 13*a* and a second opening 105 in the second surface 13*b*. The moving space 101, the first opening 103 and the second opening 105 are air communicated to the outside of the in-body massage.

The massage member 50 includes a mounting end and a head coupled to the mounting end, the mounting end is rotationally arranged in the shell 10, and the head received in the moving space 101. The head of massage member 50 spaced apart an inner wall of the moving space 101. In another words, a gap is defined between an outer side wall of the head of the massage member 50 and the inner wall of the moving space 101, so as to prevent the inner wall of the moving space 101 from obstructing movement of the massage member 50. The cross-size of the head may be greater than that of the mounting end, and partly protrudes into the areas 108 defined by the recessed surfaces 102 through the first and second openings 103, 105.

At least one of the handle portion 11 and the in-body portion 13 is of an internally hollow structure, with an accommodating space 107 formed internally to accommodate the battery 20, the circuit board 30, and the driving mechanism 40. The accommodating space 107 and the moving space 101 are interconnected. In the present embodiment, the accommodating space 107 is arranged in the handle portion 11.

An outer side wall of the massage member 50 and an inner wall of the moving space 101 are spaced apart. As shown in FIG. 2, the width H1 of the in-body portion 13 is greater than the width H2 of the moving space 101, and the width H2 of the moving space 101 is greater than the maximum width H3 of the massage member 50, such that in the width direction of the shell 10, the width H3 of the massage member 50 is less than the width H2, such that when the massage member 50 rotates in the moving space 101, the inner wall of the moving space 101 do not obstruct rotation of the massage member 50.

The arc-shaped recessed surface 102 includes two highest points, and an extension line L is defined by the two highest points. In the present embodiment, the massage member 50 extends to the recessed surface 102, but does not extend beyond the extension line L, such that during massaging, a portion of the part to be massaged enters into an area defined by the recessed surface 102 and then directly contacts with an outer surface of the massage member 50 which entering the area through the first opening or the second opening, so that the part to be massaged is massaged. It can be understood that the highest point of the protruding portion of the massage member 50 does not exceed the extension line L, which can be designed according to actual needs. In the present embodiment, the structural setting between the massage member 50 and the recessed surface 102 conforms to the shape of the human vagina, such that the massage member 50 can fit with the pelvic floor muscles to massage the pelvic floor muscles.

Referring to FIG. 1 and FIG. 2, the shell 10 is made of a hard material (e.g. indeformable material), with covering by a protective cover 60, and the protective cover 60 is made of a flexible material. The hardness of the flexible material is less than that of the hard material.

Figure 4:
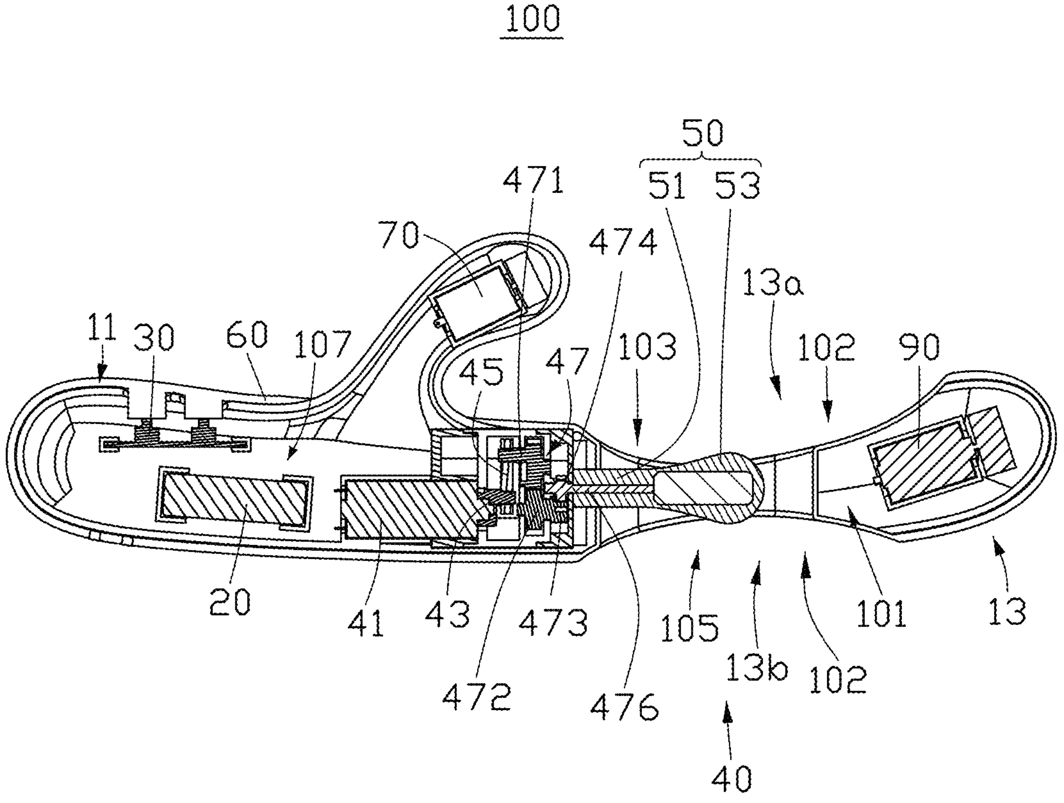
FIG. 4 is a sectional view of the in-body massager shown in FIG. 1.

Referring to FIG. 3 and FIG. 4, a driving mechanism 40 is accommodated in the accommodating space 107 in the handle portion 11, and includes a driving motor 41, an output shaft 43, a connecting rod 45, a transmission assembly 47, and a bracket 49. The bracket 49 is fixedly mounted to the driving motor 41, one end of the driving motor 41 is eccentrically connected to the output shaft 43, the output shaft 43 is connected to the end of the connecting rod 45, the connecting rod 45 is eccentrically connected to the transmission assembly 47, such that the power is transmitted to the transmission assembly 47. One end of the transmission assembly 47 is connected to the massage member 50, and the output shaft 43, the connecting rod 45 and the transmission assembly 47 are accommodated in the bracket 49. Driven by the driving motor 41, the massage member 50 rotates in a reciprocating manner and contacts with the inner wall of the vagina to knead and massage the pelvic floor muscles.

Specifically, the driving motor 41 is fixedly accommodated at the bottom of the accommodating space 107. The bracket 49 is fixedly mounted to one side of the driving motor 41 and is fixedly connected to an inner wall of the handle portion 11.

The bracket 49 includes a fixing portion 491 and a cover 493. The fixing portion 491 is plate-shaped and is fixedly mounted to one side of the driving motor 41. The cover 493 covers the fixing portion 491 to accommodate the output shaft 43 and a portion of the transmission assembly 47. The inside of the cover 493 is divided into two spaces, i.e., including a first accommodating space 495 and a second accommodating space 497. A through hole 499 is formed at the position at which the first accommodating space 495 is connected with the second accommodating space 497.

The output shaft 43 is formed by protruding eccentrically from one end of the driving motor 41 and is accommodated in the first accommodating space 495. The other end of the output shaft 43 is inserted into one end of the connecting rod 45, and the other end of the connecting rod 45 is connected to the transmission assembly 47. In the present embodiment, the output shaft 43 is of an eccentric structure. The connecting rod 45 is of a long strip structure, one end of the connecting rod 45 is connected to the output shaft 43 and the other end is connected to the transmission assembly 47. In the present embodiment, the connecting rod 45 is accommodated inside the first accommodating space 495.

The transmission assembly 47 is mounted in the second accommodating space 497, and the transmission assembly 47 includes a first gear member 471, a second gear member 472, a third gear member 473, and a fourth gear member 474, wherein the first gear member 471 is accommodated inside the second accommodating space 497, the first gear member 471 is eccentrically connected to an end of the connecting rod 45, and rotates relative to the bracket 49. Referring to FIG. 3, an end 4711 of the first gear member 471 is provided with a connecting rod 4713 which protrudes eccentrically, a rotating shaft 4714 is arranged to protrude from the end 4711 of the first gear member 471, and the rotating shaft 4714 is rotationally fixed to an inner wall of the second accommodating space 497. One end of the connecting rod 4713 of the first gear member 471 is connected to an end 451, away from the output shaft 43, of the connecting rod 45 via the through hole 499, and the other end of the connecting rod 4713 rotates relative to the inner wall of the cover 493, such that under the driving of the driving motor 41, the connecting rod 45 drives the first gear member 471, and the first gear member 471 auto-rotates inside the second accommodating space 497.

The second gear member 472 is accommodated in the second accommodating space 497, and two rotating shafts of the second gear member 472 are respectively rotationally connected to an inner wall of the second accommodating space 497. One end 4721 of the second gear member 472, away from the driving motor 41, is rotationally connected to an inner wall of the second accommodating space 497, and another end 4722 of the second gear member 472, close to the driving motor 41, is rotationally connected to the inner wall thereof. The first gear member 471 is engaged with the second gear member 472. When the first gear member 471 is driven to rotate by the connecting rod 45, the second gear member 472 also rotates synchronously. Moreover, since the output shaft 43 and the first motor are eccentrically connected, the connecting rod 45 and the first gear member 471 are also eccentrically connected.

Under the driving of the driving motor 41, the output shaft 43 rotates eccentrically, at this time, one end of the connecting rod 45 is driven by the output shaft 43 to rotate by 360 degrees around the output shaft 43, meanwhile, the other end of the connecting rod 45 drives the first gear member 471, i.e., the connecting rod 45 as a whole moves along the runway-like oval. Since the diameter of the output shaft 43 is smaller than the diameter of the first gear member 471, when the output shaft 43 rotates for half a circle along a clockwise direction, the connecting rod 45 drives the first gear member 471 to rotate for less than half a circle along a clockwise direction, and at this time, the connecting rod 45 as a whole moves clockwise, and then, when the output shaft 43 continues to rotate clockwise after rotating for half a circle, the connecting rod 45 as a whole moves counterclockwise, such that the first gear member 471 rotates simultaneously along the counterclockwise direction, and the first gear member 471 switches in a reciprocating manner between clockwise rotation and counterclockwise rotation when the output shaft 43 rotates by 360 degrees. Consequently, the second gear member 472 is driven by the first gear member 471 to rotate synchronously in a reciprocating manner, i.e. the second gear member 472 also switches in a reciprocating manner between clockwise rotation and counterclockwise rotation.

The third gear member 473 is located on an outer wall, close to the second accommodating space 497, of the cover 493, and one end 4731 of the third gear member 473 is fixedly connected to one of the rotating shafts of the second gear member 472, i.e., the third gear member 473 and the second gear member 472 are coaxially arranged. The end 4731 of the third gear member 473 is further rotationally connected to the bracket 49. In the present embodiment, the diameter of the third gear member 473 is smaller than the diameter of the second gear member 472.

A fourth gear member 474 is arranged on an outer wall, close to the second accommodating space 497, of the cover 493, and the third gear member 473 is engaged with the fourth gear member 474. One rotating shaft of the fourth gear member 474 is rotationally connected to the cover 493, and the other rotating shaft of the fourth gear member 474 is fixedly connected to a connecting column 476, and an end of the connecting column 476 is rotatably connected to the receiving space 497, and another end of the connecting column 476 is connected to the massage member 50. When the third gear member 473 rotates in a reciprocating manner by switching between clockwise rotation and counterclockwise rotation, the fourth gear member 474 is driven to rotate synchronously in a reciprocating manner, and the massage member 50 is driven by the fourth gear member 474 to rotate synchronously in a reciprocating manner. When driven by the driving motor 41, the output shaft 43 is driven to synchronously rotate by 360 degrees along a clockwise direction, the connecting rod 45 is driven to rotate by a certain angle towards a fixed direction, and then the connecting rod 45 rotates towards the original direction, and the first gear member 471, the second gear member 472, the third gear member 473 and the fourth gear member 474 are all driven to synchronously rotate in a reciprocating manner by a certain angle through an engaging or connection relation, and further the massage member 50 is driven to rotate in a reciprocating manner, to knead and massage the pelvic floor muscles.

It will be understood that the bracket 49 can be omitted, and the first gear member 471, the second gear member 472, the third gear member 473 and the fourth gear member 474 are connected to the inner wall of the shell as long as normal rotation of the first gear member 471, the second gear member 472, the third gear member 473 and the fourth gear member 474 can be supported. In addition, the second gear member 472, the third gear member 473 and the fourth gear member 474 may together form a gear set, wherein one side of the gear set is engaged with the first gear member 471, one side 477 of the gear set is rotationally connected to the bracket 49 and the other side 478 of the gear set is connected with the massage member 50 via the connecting column 476.

Figure 5:
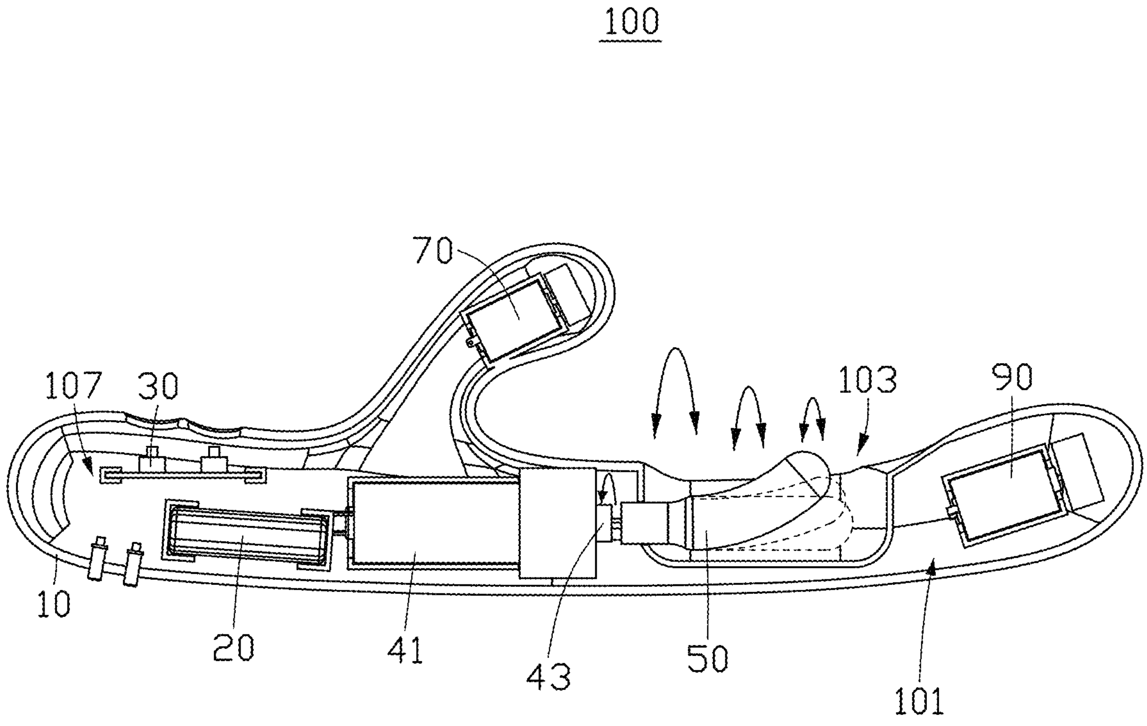
FIG. 5 is a schematic diagram of another driving structure of the in-body massager shown in FIG. 1.

Referring to FIG. 5, in other embodiments, the driving mechanism 40 may also include only a driving motor and an output shaft 43. Wherein one end of the output shaft 43 is connected to the driving motor, and the other end is connected to the end of the massage member 50, such that when the driving motor rotates by 360 degrees, the output shaft 43 drives the massage member 50 to synchronously rotate by 360 degrees as well.

Referring to FIG. 4, the massage member 50 is mounted in the in-body portion 13, and a portion of the massage member 50 protrudes out of the two moving space 101 via the first opening 103 and the second opening 105. In the width direction (i.e., the Y-axis direction) of the shell 10, an end face of the protruding portion of the massage member 50 is higher than the end face of the in-body portion 13, such that when the vagina of a woman contacts with the shell 10, the pelvic floor muscles directly contact with the protruding portion of the massage member 50 and are massaged.

The massage member includes a head 53 exposed in the moving space 101 and a mounting portion 51 connecting with the output shaft 43 or the connecting column 476, the head 53 is entirely spaced apart from an inner wall of the moving space 101.

It can be understood that the massage member 50 is curve structure, one end of which is fixed to the inner wall of the in-body portion 13, and the other end of which is curved and extended to protrude from the two moving spaces 101, so that the end portion protruding from the moving spaces 101 is driven to rotate in a swing-like manner. Due to the curved structure of the massage member 50, the overall motion trajectory of the massage member 50 is annular.

One end of the massage member 50 is fixedly connected to the connecting column 476, and the other end extends and is arranged in the moving space 101, such that the massage member 50 is switched between clockwise rotation and counterclockwise rotation in the moving space 101 to massage the pelvic floor muscles and quickly restore vitality the pelvic floor muscles.

The height, vertical to the extension direction of the shell 10, of the massage member 50 is greater than the height of the middle portion between the first opening 103 and the second opening 105, such that two ends of the massage member 50 protrude from the first opening 103 and the second opening 105 and can directly contact with the inner wall of the vagina.

The massage member 50 is made of a hard material and is sleeved with a flexible material, or the massage member 50 as a whole is made of a flexible material.

It can be understood that the reciprocating rotation of the massage member 50 may also be achieved by relying on a circuitry and the corresponding program control, without relying on the structural setting of the driving mechanism 40.

Moreover, a first massage portion 70 further extends along a direction of the handle portion 11 close to the recessed surface 102, the first massage portion 70 can provide a vibratory massage effect, and the first massage portion 70 is arranged to be opposite to the first surface 13*a*. The first massage portion 70 does not extend into the body of a woman, but outside the vaginal opening, to provide vibratory massage to the muscles outside the pelvic floor muscles and further contract the muscles outside the pelvic floor muscles.

The end, away from the handle portion 11, of the in-body portion 13 is also mounted with a second massage portion 90, the second massage portion 90 is internally mounted with a vibrating motor, and the vibrating motor can extend into the vagina to perform vibratory massage on the bottom of the vagina.

The in-body massager 100 of the present application has three massage structures and two massage methods, and the in-body massager 100 can extend into the body of a woman and massage the pelvic floor muscles, and is lightweight in size. Compared to the existing patting massage and kneading massage of the pelvic floor muscles, the in-body massager 100 of the present solution produces a massage effect of rotating and kneading, has a larger contact area with the muscles inside the vagina, and can massage continuously with a soft massage intensity.

Embodiment 2

Figure 6:
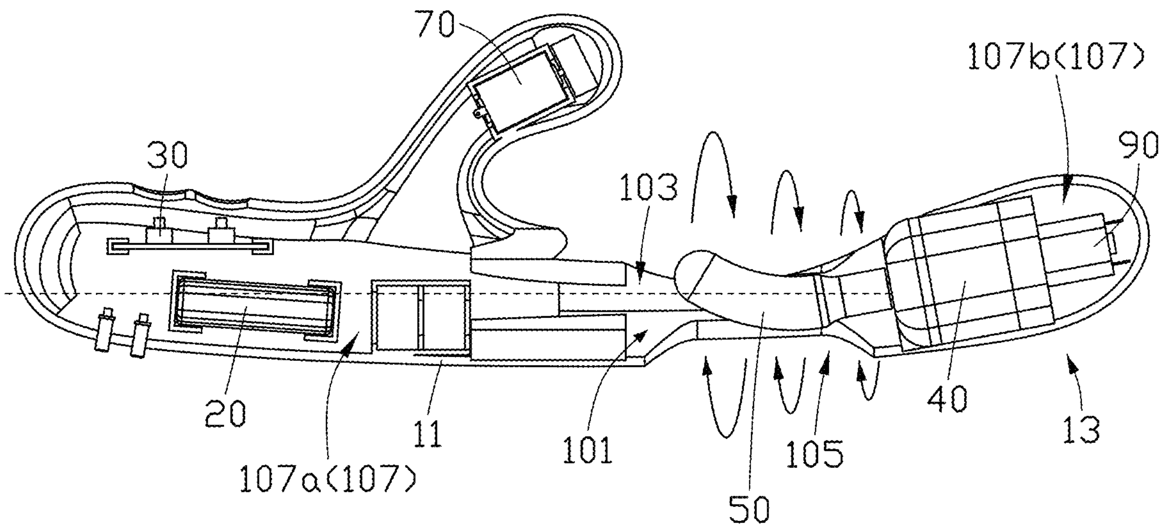
FIG. 6 is a sectional view of an in-body massager of Embodiment 2 of the present disclosure.

Referring to FIG. 6, Embodiment 2 differs from Embodiment 1 in that the handle portion 11 of the shell 10 is formed with a first accommodating space 107*a*, the first accommodating space 107*a* is configured to accommodate the battery 20 and the circuit board 30, the in-body portion 13 of the shell 10 is formed with a second accommodating space 107*b*, the driving mechanism 40 is accommodated in the second accommodating space 107*b*, and the massage member 50 extends from one end of the driving mechanism 40 and extends along the direction of the moving space 101. At this time, the extension direction of the massage portion 70 is opposite to the extension direction of the massage member 50, when the massage member 50 rotates in the direction, the massage member 50 can knead and massage the urethra close to the vagina, so as to stimulate the contraction and relaxation of the urethra, improve the elasticity of the urethra, and decrease leakage of urine of a woman after childbirth.

Embodiment 3

Figure 7:
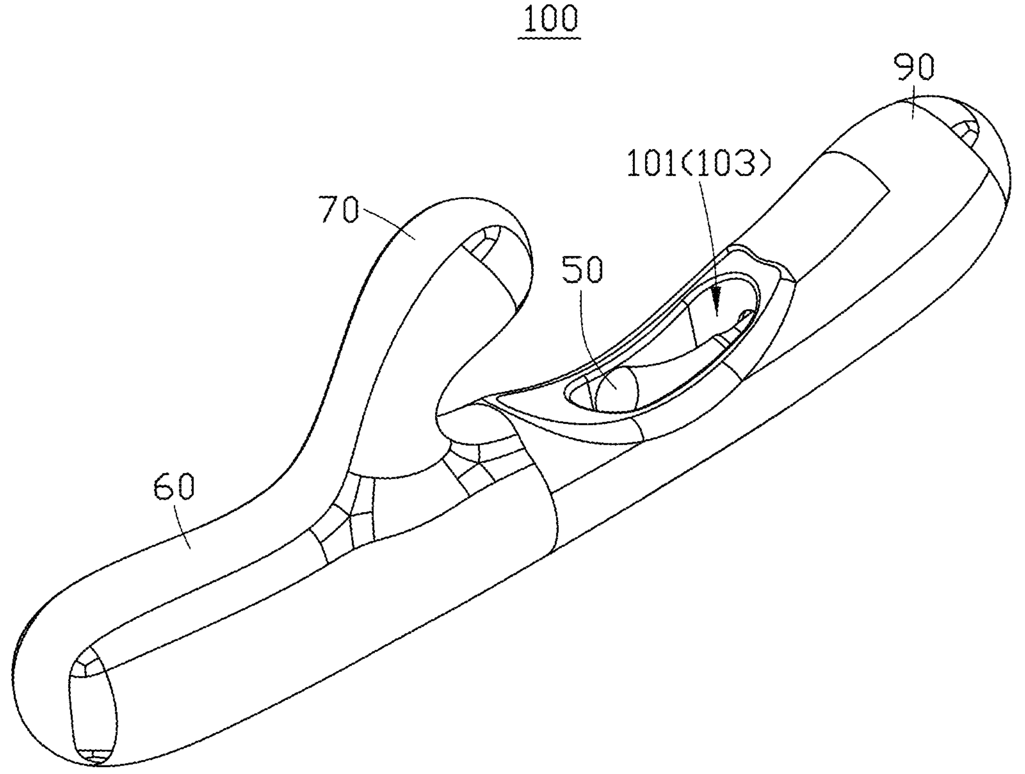
FIG. 7 is a three-dimensional diagram of an in-body massager of Embodiment 3 of the present disclosure.

Referring to FIG. 7, Example 3 differs from Example 1 in that the second opening 105 of the moving space 101 of the shell 10 is closed and the first opening 103 is open to protrude the massage member 50. The massage member 50 is strip-shaped, one end of the massage member 50 bends towards the direction of the first opening 103 and protrudes out of the first opening 103, and can quickly contact with a certain portion of the muscles in the pelvic floor to knead and massage this portion of muscles.

Embodiment 4

Figure 8:
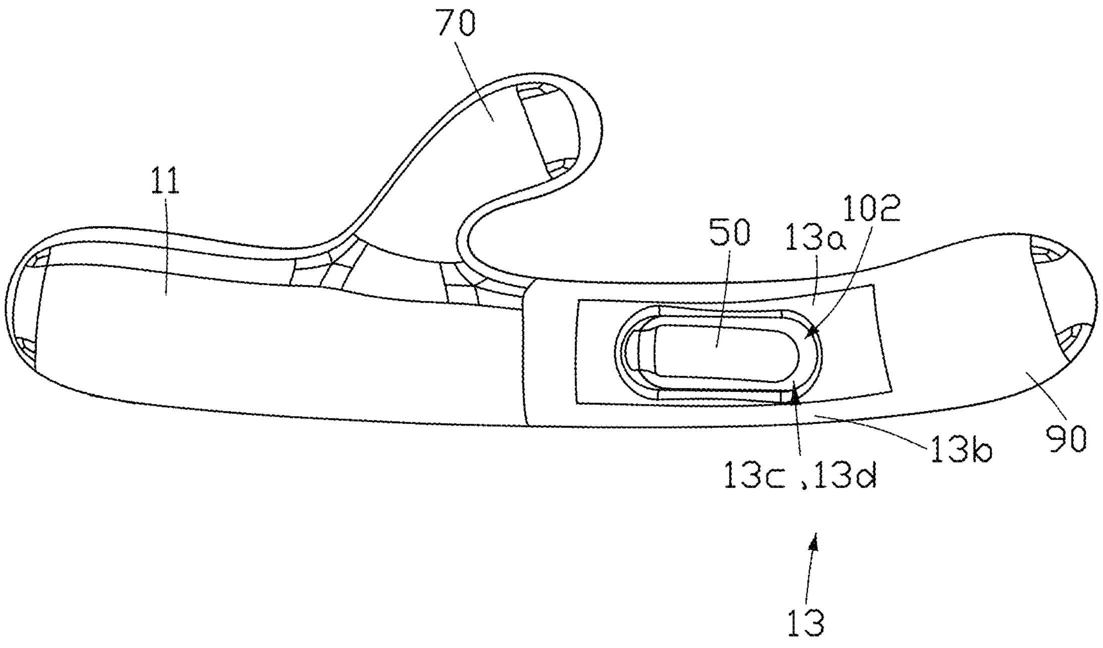
FIG. 8 is a three-dimensional diagram of an in-body massager of Embodiment 4 of the present disclosure.

Referring to FIG. 8, Embodiment 4 differs from Embodiment 1 in that the two recessed surfaces 102 are respectively formed in the third surface 13*c* and the fourth surface 13*d*, moreover, the moving space 101 penetrates through the third surface 13*c* and the fourth surface 13*d*, and the structure allows for deep massage of the muscles of the side wall of the pelvic floor and stimulates the inner side wall of the vagina.

Embodiment 5

Figure 9:
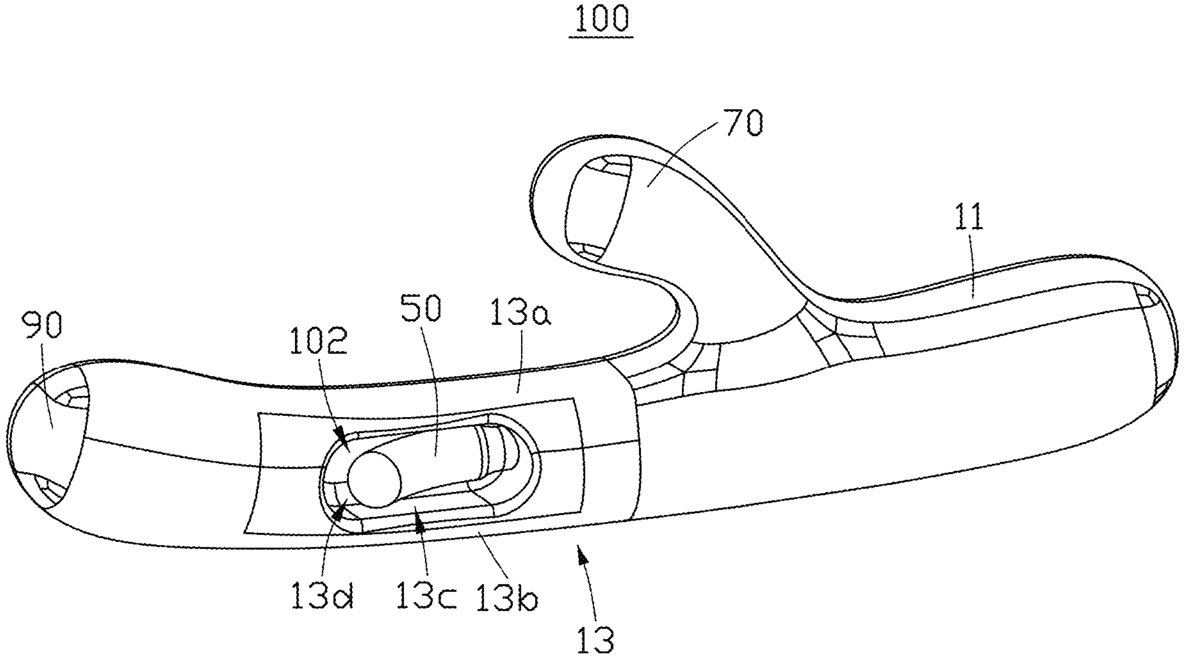
FIG. 9 is a three-dimensional diagram of an in-body massager of Embodiment 5 of the present disclosure.

Referring to FIG. 9, Embodiment 5 differs from Embodiment 1 in that the recessed surface 102 is limited to the third surface 13*c*, such that when a woman has a wound on one side during childbirth, the massage member 50 can extend into the body of the woman towards the side without the wound and massage the pelvic floor muscles without causing secondary injury to the wound side.

Embodiment 6

Figure 10:
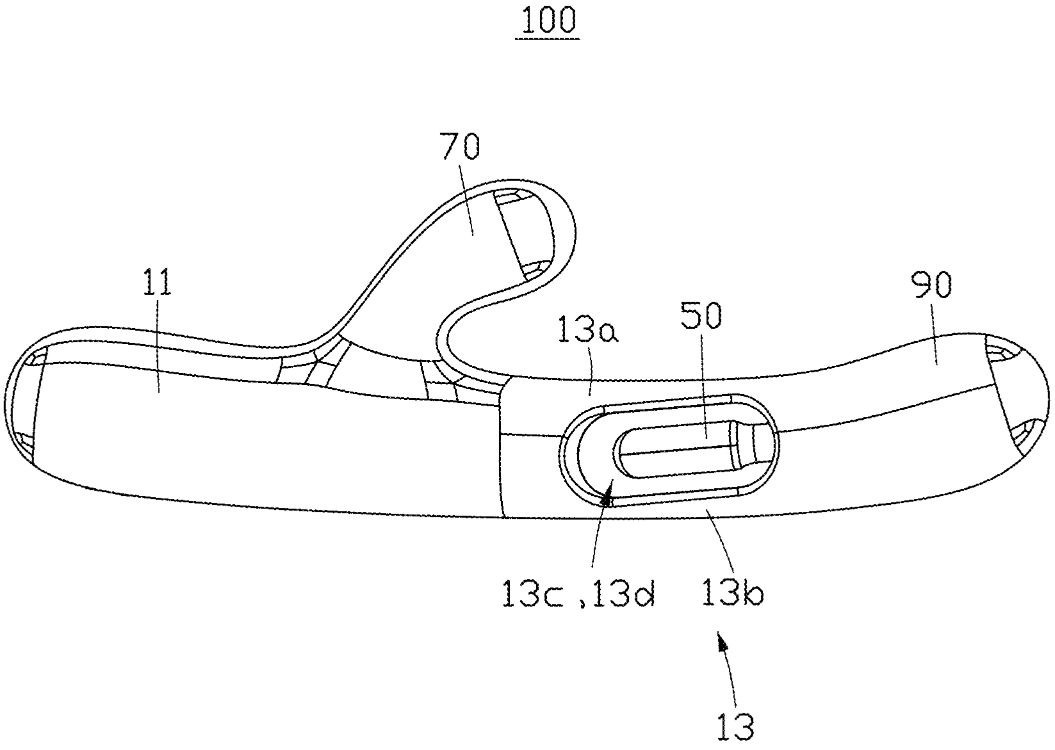
FIG. 10 is a three-dimensional diagram of an in-body massager of Embodiment 6 of the present disclosure.

Referring to FIG. 10, Embodiment 6 differs from Embodiment 4 in that the driving mechanism 40 is mounted in a different position.

The driving mechanism 40 is accommodated inside the in-body portion 13, and the massage member 50 extends from one end of the driving mechanism 40 and extends along a direction of the moving space 101.

The invention claimed is:

1. An in-body massager configured for massaging a part of a body, comprising:
- a shell insertable into the part of the body;
- a moving space defined in the shell, the moving space including a first opening defined in a lateral wall of the shell and communicating with an exterior of the in-body massager;
- a driver mounted in the shell; and
- a massage member received in the shell and partly extending into the moving space, wherein the massage member is connected to and driven by the driver, the massage member is rotatable along a longitudinal extending direction of the shell when driven, the driver comprises a driving motor, an output shaft, a connecting rod and a transmission assembly, the transmission assembly comprises a first gear member, one end of the output shaft is eccentrically connected to the driving motor, another end of the output shaft is connected to one end of the connecting rod, another end of the connecting rod is connected eccentrically to the first gear member of the transmission assembly, and an end, away from the connecting rod, of the transmission assembly is connected to the massage member, the connecting rod is perpendicular to an extension direction of the output shaft, the driving motor drives the output shaft to rotate by 360 degrees, and the output shaft cooperates with the connecting rod to make the transmission assembly reciprocate between clockwise rotation and counterclockwise rotation, such that the massage member is switchable between rotating clockwise and counterclockwise.

2. The in-body massager according to claim 1, wherein the massage member includes a head exposed in the moving space and a mounting portion connecting with the driver, the head is entirely spaced apart from an inner wall of the moving space.

3. The in-body massager according to claim 2, wherein a first recessed surface is formed at a first lateral surface of the shell, the first recessed surface has a predefined length in the longitudinal extending direction of the shell, when an area of the first recessed surface surrounds the part of the body, the head is contactable to the part of the body without protruding out of the area.

4. The in-body massager according to claim 3, wherein the first opening is formed in the first recessed surface, and a portion of the head of the massage member extends to the area via the first opening.

5. The in-body massager according to claim 4, wherein the massage member does not extend beyond the area.

6. The in-body massager according to claim 5, wherein the head is fixedly attached to the mounting portion, the head is bent toward the first opening and switchable between a first state and a second state, wherein the head is extended into the area in the first state, and the head is not extended into the area in the second state.

7. The in-body massager according to claim 5, wherein the moving space further includes a second opening opposite the first opening, the moving space communicates with the exterior of the in-body massager through the second opening, the shell further forms a second recessed surface opposite to the first recessed surface, the head partly extends into an area surrounded by the second recessed surface and is further contactable with the part of the body in the area surrounded by the second recessed surface.

8. The in-body massager according to claim 1, wherein the transmission assembly further comprises a gear set, another end of the first gear member is rotationally connected to the shell, the gear set is engaged with the first gear member, one side of the gear set is rotationally connected to the shell, and another side of the gear set is connected to the massage member.

9. The in-body massager according to claim 8, wherein the gear set comprises a second gear member, a third gear member, a fourth gear member and a connecting column, the second gear member and the third gear member are coaxially arranged, and ends of the second gear member rotate relative to the shell, and the second gear member is engaged with the first gear member, the third gear member is engaged with the fourth gear member, the fourth gear member is fixed to one end of the connecting column, and another end of the connecting column is connected to the massage member.

10. The in-body massager according to claim 1, wherein the massage member is covered by an elastic cover.

11. The in-body massager according to claim 1, wherein the shell comprises a handle portion and an in-body portion connected to the handle portion, the handle portion exposes out of the part of the body when the in-body portion is inserted into the part of the body, the in-body portion includes a distal end and a connecting end connected to the handle portion, the moving space is formed adjacent to the connecting end, the massage member is coupled to the distal end.

12. An in-body massager comprising, a shell comprises:

a handle portion;

an insertion portion configured for inserting into a vagina along an insertion direction, the insertion portion extending and protruding from one end of the handle portion along the insertion direction, the insertion portion comprising a first recessed surface and a second recessed surface which are arranged opposite to each other, the first recessed surface and the second recessed surface are curved and formed by extending downwards in an inclined manner from one end adjacent to the handle portion and extending upwards towards away from the handle portion, the first recessed surface and the second recessed surface communicate to an exterior of the in-body massager;

a driver mounted in the shell; and a massage member comprising a bent structure, the massage member protruding from the insertion portion and extending out of one of the first and the second recessed surface, the massage member configured for massaging skin on an inner side wall of the vagina, wherein the driver comprises a driving motor, an output shaft, a connecting rod and a transmission assembly, the transmission assembly comprises a first gear member, one end of the output shaft is eccentrically connected to the driving motor, another end of the output shaft is connected to one end of the connecting rod, another end of the connecting rod is connected eccentrically to the first gear member of the transmission assembly, and an end, away from the connecting rod, of the transmission assembly is connected to the massage member, the connecting rod is perpendicular to an extension direction of the output shaft, the driving motor drives the output shaft to rotate by 360 degrees, and the output shaft cooperates with the connecting rod to make the transmission assembly reciprocate between clockwise rotation and counterclockwise rotation, such that the massage member is switchable between rotating clockwise and counterclockwise.

13. The in-body massager according to claim 12, wherein a first imaginary line is defined by connecting highest points between two ends of the first recessed surface, a second imaginary line is defined by connecting highest points between two ends of the second recessed surface,
the massage member does not protrude out of the first imaginary line and the second imaginary line, and the massage member rotates between the first imaginary line and the second imaginary line relative to the shell.
14. The in-body massager according to claim 13, wherein
lengths of the first and the second imaginary lines are between 55-65 mm, the lengths of the first and the second imaginary lines are between ½ and ¾ of a length of the insertion portion.
15. The in-body massager according to claim 12, wherein
a receiving space is defined in the insertion portion, and the receiving space is communicating with the first recessed surface and the second recessed surface,
a driving unit is received in the receiving space, an output end of the driving unit is connected to one end of the massage member, another end of the massage member extends and protrudes from the receiving space and extends toward the first recessed surface or toward the second recessed surface in a bending way, the driving unit drives the massage member to rotate in a reciprocating manner relative to the shell.
16. The in-body massager according to claim 15, wherein
the driving unit comprises a driving motor and a transmission member, the output end of the driving unit protrudes from an end of the driving motor, the output end is driven to rotate in a reciprocating manner by the driving motor and movements of the output end define a first motion track,
a projection plane of the first motion track is a circular plane;
one end of the transmission member is engaged with the output end of the driving motor, and another end of the transmission member is coupled to the massage member;
the massage member is driven to rotate in a reciprocating manner between the clockwise direction and the anticlockwise direction, movements of the massage member define a second motion track, a projection plane of the second motion track is arc-shaped, a radius of the first motion track is smaller than the radius of the second motion track.
17. The in-body massager according to claim 12, wherein
the transmission assembly further comprises a gear set engaged with the first gear member, one side of the gear set is rotationally connected to the shell, and another side of the gear set is connected to the massage member,
the gear set comprises a second gear member, a third gear member, a fourth gear member and a connecting column, the second gear member and the third gear member are coaxially arranged, and ends of the second gear member rotate relative to the shell, and
the second gear member is engaged with the first gear member, the third gear member is engaged with the fourth gear member, the fourth gear member is fixed to one end of the connecting column, and another end of the connecting column is connected to the massage member.
18. An in-body massager comprising,
an insertion portion and a handle portion, wherein the insertion portion extends along a first direction from one side of the handle portion, and the insertion portion is configured for inserting into a vagina and massaging the vagina from the first direction;
a first massage portion is extended outwardly from a side of the handle portion towards the insertion portion; and
a driver mounted in at least one of the handle portion and the insertion portion, wherein
the first massage portion is not configured to be inserted into the vagina while the first massage portion massages skin outside the vagina from a second direction,
the first direction is different from the second direction,
a housing of the insertion portion comprises a first side surface, the first side surface is inwardly concave to form a first opening,
a second massage portion is configured to perform a rotating massage for the inner lateral wall of the vagina,
an end of the second massage portion is rotatably engaged with a side wall of the insertion portion, and another end of the second massage portion is extended toward the first opening,
and skin on the vagina is capable of being sunken into the first opening so as to be massage by the second massage portion,
the driver comprises a driving motor, an output shaft, a connecting rod and a transmission assembly, the transmission assembly comprises a first gear member,
one end of the output shaft is eccentrically connected to the driving motor, another end of the output shaft is connected to one end of the connecting rod, another end of the connecting rod is connected eccentrically to the first gear member of the transmission assembly, and an end, away from the connecting rod, of the transmission assembly is connected to the massage member,
the connecting rod is perpendicular to an extension direction of the output shaft,
the driving motor drives the output shaft to rotate by 360 degrees, and the output shaft cooperates with the connecting rod to make the transmission assembly reciprocate between clockwise rotation and counterclockwise rotation, such that the massage member is switchable between rotating clockwise and counterclockwise.
19. The in-body massager according to claim 18, wherein
the housing of the insertion portion comprises a second side surface arranged opposite to the first side surface, the second side surface is inwardly concave to form a second opening, the second opening and the first opening are arranged oppositely and are in air communication with each other,
the first opening and the second opening are both concave structures, and each center of the concave structure forms a lowest point,
the second massage portion includes a bent shape, the end of the second massage portion is rotatably connected with an inner wall of the insertion portion, and the another end of the second massage portion protrudes out of the lowest points of the two concave structures.
20. The in-body massager according to claim 18, wherein
the transmission assembly further comprises a gear set engaged with the first gear member, one side of the gear set is rotationally connected to the shell, and another side of the gear set is connected to the massage member,
the gear set comprises a second gear member, a third gear member, a fourth gear member and a connecting column, the second gear member and the third gear member are coaxially arranged, and ends of the second gear member rotate relative to the shell, and the second gear member is engaged with the first gear member, the third gear member is engaged with the fourth gear member, the fourth gear member is fixed to one end of the connecting column, and another end of the connecting column is connected to the massage member.

* * * * *